United States Patent
Demsky et al.

(10) Patent No.: US 7,086,003 B2
(45) Date of Patent: Aug. 1, 2006

(54) ATTACHING MULTIPLE FILES TO AN ELECTRONIC DOCUMENT

(75) Inventors: Scott H. Demsky, Boca Raton, FL (US); William R. Ferguson, Boca Raton, FL (US); Robert M. Szabo, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 10/460,917

(22) Filed: Jun. 13, 2003

(65) Prior Publication Data

US 2004/0255247 A1    Dec. 16, 2004

(51) Int. Cl.
    G06F 17/24    (2006.01)
(52) U.S. Cl. .................... 715/530; 707/101
(58) Field of Classification Search .......... 715/530, 715/531; 709/206, 201; 707/101
    See application file for complete search history.

(56) References Cited

U.S. PATENT DOCUMENTS

| | | | |
|---|---|---|---|
| 5,706,510 A | 1/1998 | Burgoon | |
| 5,758,358 A | 5/1998 | Ebbo | |
| 6,023,710 A | 2/2000 | Steiner et al. | |
| 6,067,551 A | 5/2000 | Brown et al. | |
| 6,073,133 A * | 6/2000 | Chrabaszcz | 715/500 |
| 6,205,471 B1 * | 3/2001 | Gilchrist et al. | 709/206 |
| 6,216,140 B1 | 4/2001 | Kramer | |
| 6,242,766 B1 | 6/2001 | Tateno | |
| 6,341,291 B1 | 1/2002 | Bentley et al. | |
| 6,343,295 B1 | 1/2002 | MacLeod et al. | |
| 6,360,252 B1 * | 3/2002 | Rudy et al. | 709/206 |
| 6,385,767 B1 | 5/2002 | Ziebell | |
| 6,546,417 B1 * | 4/2003 | Baker | 709/206 |
| 6,604,132 B1 * | 8/2003 | Hitt | 709/206 |
| 6,898,622 B1 * | 5/2005 | Malik | 709/206 |
| 2003/0225837 A1 * | 12/2003 | Delia et al. | 709/206 |
| 2004/0019644 A1 * | 1/2004 | Fellenstein et al. | 709/206 |
| 2004/0158607 A1 * | 8/2004 | Coppinger et al. | 709/206 |
| 2004/0186851 A1 * | 9/2004 | Jhingan et al. | 707/104.1 |

OTHER PUBLICATIONS

Microsoft® Outlook® 2000 (© 1999).*

* cited by examiner

*Primary Examiner*—Doug Hutton
(74) *Attorney, Agent, or Firm*—Akerman Senterfitt

(57) ABSTRACT

A method of associating multiple files with an electronic document can include receiving a request to attach at least two files to an electronic document and attaching the at least two files to the electronic document. A visual identifier can be included within the electronic document indicating that more than one file is attached to the electronic document.

38 Claims, 3 Drawing Sheets

ATTACHING MULTIPLE FILES TO AN ELECTRONIC DOCUMENT

BACKGROUND

1. Field of the Invention

This invention relates to the field of electronic document processing and, more particularly, to attaching files to an electronic document.

2. Description of the Related Art

Many software applications are capable of attaching copies of files to electronic documents. Common examples of such software systems can include, but are not limited to, electronic mail systems, database systems, as well as other collaborative systems such as Lotus Notes™, available from International Business Machines Corporation of Armonk, N.Y. Once a file is attached to an electronic document, whether a copy of the file is made and attached, or the original is attached, the electronic document as well as the file can be transmitted over a computer communications network to other computer systems. Alternatively, multiple users can access the attached file using suitable collaborative software, typically over a computer communications network from a central data store.

Conventional software systems can manipulate attached files in several ways. For example, the attached file can be viewed with a file viewer, launched or processed by another application, detached from the electronic document and stored as a local file, or in the case of a program file, can be executed. Though a copy of a file can be attached to an electronic document, the original file may be updated from time to time resulting in multiple versions of the attached file. Such is often the case, for example, in collaborative work environments where multiple persons or entities share responsibility for developing the file that is attached to the electronic document.

Presently, conventional collaborative applications that allow files to be attached to electronic documents lack the ability to manage multiple versions of a file within that domain. In other words, one must implement manual version control if one intends on attaching more than one version of a file to an electronic document.

For example, if a file has undergone several revisions by various persons or entities, the latest version of the file can be attached to an electronic document. If access is needed to the previous versions of the file, then each version can be attached to a separate electronic document. Alternatively, more than one version of the file can be attached to the same electronic document. When access to previous versions of the file is required, whether the versions are each attached to different electronic documents or are all attached to a same electronic document, each version of the file appears as a separate and distinct attachment in the electronic document. No indication is provided which suggests that each attachment is a different version derived from a same source file.

If file version information is provided for each version of the attached file, such information is manually inserted by a user into the subject or body portions of the electronic document. This places a significant burden upon users to continually provide information detailing the differences between each revision of a file. In particular, users are tasked with tracking attributes of the revisions such as the author or source of each revision, the date of the revision, the purpose of the revision, and any other attributes relating to revisions which provide necessary explanation to other participants within a collaborative work environment who access and edit the shared file.

SUMMARY OF THE INVENTION

The present invention provides a solution for managing multiple versions of a file attached to an electronic document. Rather than appearing as a series of seemingly unrelated and individual file attachments, multiple versions of a file can be represented using an icon. The icon can be modified and updated with further details and/or attributes of the various versions of the file which have been attached to the electronic document. Notably, the various attributes, for example a listing of the different file versions, each can be selected for initiating one or more operations upon the selected version of the file.

One aspect of the present invention is a method of associating multiple files with an electronic document. The method can include receiving a request to attach at least two files to an electronic document; attaching the at least two files to the electronic document; and including within the electronic document a visual identifier indicating that more than one file is attached to the electronic document. Notably, the at least two files can be versions of one another.

The visual identifier can include a list having a reference to each of the files which has been attached to the electronic document. Each reference of the list can be selectable. Additionally, the visual identifier can specify attribute information for each file attached to the electronic document.

The method also can include setting a threshold for a maximum number of files which can be attached to the electronic document. If the number of files to be attached to the electronic document exceeds the threshold, one or more of the files which already have been attached to the electronic document can be discarded and at least one additional file can be attached.

For example, files can be discarded by overwriting one or more of the files, by removing at least one of the files, or by removing references to one or more of the files from the electronic document. Notably, the list of files can be updated when files are attached to or removed from the electronic document. Additionally, one or more of the files attached to the electronic document can be discarded and the visual identifier can be updated according to the discarding step.

Another aspect of the present invention can include a method of associating multiple files with an electronic document including attaching a file to the electronic document and including within the electronic document a graphic representation of the file. At least a second file can be attached to the electronic document. The graphic representation of the file can be modified to specify that more than one file is attached to the electronic document. The files to be attached to the electronic document can be versions of one another.

Notably, the graphic representation can include a list having a reference to each file which has been added to the electronic document. Each reference within the listing can be selectable. The method also can include attaching additional files to the electronic document and, for each additional file attached, including a reference to the additional file in the list of files that are attached to the electronic document. The graphic representation further can specify attribute information for each file attached to the electronic document.

The method also can include setting a threshold for a maximum number of files which can be attached to the electronic document. If the number of files to be attached to the electronic document exceeds the threshold, one or more of the files which already have been attached to the electronic document can be discarded and at least one additional file can be attached.

As noted, files can be discarded by overwriting one or more of the files, by removing at least one of the files, or by removing references to at least one of the files from the electronic document. Notably, the list of files can be updated when files are attached to or removed from the electronic document. Additionally, one or more files attached to the electronic document can be discarded and the visual identifier can be updated according to the discarding step.

Another aspect of the present invention can include a system for associating multiple files with an electronic document. The system can include means for receiving a request to attach at least two files to an electronic document; means for attaching the at least two files to the electronic document; and means for including within the electronic document a visual identifier indicating that more than one file is attached to the electronic document. As noted, the files to be attached to the electronic document can be versions of one another.

According to another embodiment of the present invention, the system can include means for attaching a file to the electronic document; means for including within the electronic document a graphic representation of the file; means for attaching at least a second file to the electronic document; and means for modifying the graphic representation of the file to specify that more than one file is attached to the electronic document. The files can be versions of one another.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method, system, and apparatus for managing multiple versions of a file attached to an electronic document. According to the present invention, multiple versions of the file can be attached to an electronic document in serial or parallel fashion. The multiple versions of the file can be visually represented using a single identifier which, if so configured, can specify details and/or attributes of the various revisions of the file that have been attached to the electronic document. The various details and/or attributes can be selected to access additional interfaces for performing operations upon the attached versions of the file.

As used herein, the term "attach" can include, but is not limited to, including a copy of a selected file within an electronic document, including an original file within the electronic document, or associating a file with an electronic document, for example by including within the electronic document a reference, such as a path or pointer, to the selected file.

Figure 1:
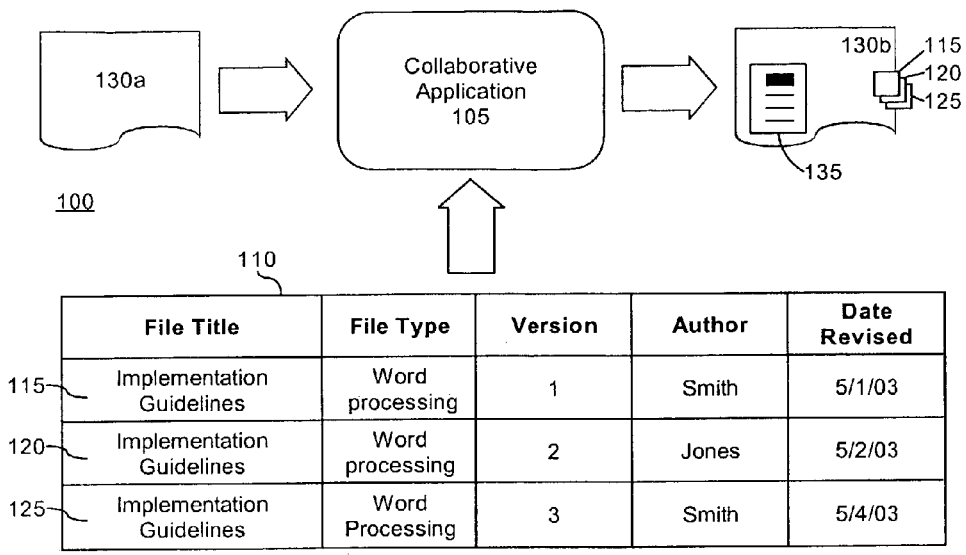
FIG. 1 is a schematic diagram illustrating a system for attaching multiple versions of a file to an electronic document in accordance with the inventive arrangements disclosed herein.

FIG. 1 is a schematic diagram illustrating a system 100 for attaching multiple versions of a file to an electronic document. As shown in FIG. 1, the system 100 can include a collaborative application 105 and a data store 110. The collaborative application 105 can generate electronic documents such as electronic mails, instant messages, intranet pages and/or Internet pages, for example using a markup language such as Hypertext Markup Language (HTML) and/or Extensible Markup Language (XML). Still, the electronic documents can be any of a variety of files to which other files can be attached.

Although the collaborative application 105 can be centrally located and disposed in any of a variety of suitable computer systems, according to one embodiment, the collaborative application 105 can be a client application. For example, the collaborative application 105 can be a client application existing as part of a larger messaging and collaboration system such as Lotus Notes (TM) available from International Business Machines Corporation of Armonk, N.Y.

The data store 110 can include one or more files, whether word processing documents, source code files, or other electronic documents. For example, the data store 110 can store multiple versions 115, 120, and 125 of a file. A version of a file can refer to a file which makes a previous copy or draft of that file obsolete, or otherwise invalid. Such can be the case, for example, where users are to use the latest version of a particular document. In that case, the latest draft of the file renders previous drafts invalid or possibly inaccurate as not containing up to date data. The data store 110 can be a local data store, for instance, residing within a user's computer system, or can be a remotely located data store that is accessible to the collaborative application 105 via a computer communications network.

The data store 110 also can include various attributes of each version of the file. As shown, the data store 110 can include attributes such as the file name, the type of the file, for example as specified by a file extension to associate the file with a particular application program, a version number or identifier, an author or identifier indicating a person or entity having made revisions to a particular version of the file, as well as the date of any such revisions. It should be appreciated, however, that additional attributes can be included in the data store 110. For example, each version of the file also can include an attribute identifying the owner, i.e. the person or entity having ultimate responsibility for maintenance of the file.

In operation, the collaborative application 105 can receive an electronic document 130a and attach one or more versions 115, 120, and 125 of a file to the electronic document 130a. For example, the electronic document 130a can be retrieved from another data store that is communicatively linked to the collaborative application 105. After processing, the processed electronic document, denoted as 130b, has each version 115, 120, and 125 of the file entitled "Implementation Guidelines" attached thereto. The electronic document 130b further specifies a visual identifier 135 that represents the attached versions 115, 120, and 125. The visual identifier 135 can be interpreted and rendered by the collaborative application 105 or another such application. Thus, if the electronic document 130b is accessed using another collaborative application, whether the electronic document has been published to a data store which can be accessed by the collaborative application, or is an electronic mail or instant message received by the collaborative application, accessing users can determine that three versions of the file entitled "Implementation Guidelines" have been attached to the electronic document 130b by referencing the visual identifier 135.

While the collaborative application 105 can be used in conjunction with a document management system (DMS), it should be appreciated that the collaborative application 105, in accordance with the inventive arrangements disclosed herein, also can serve as a replacement for a DMS. That is, the present invention provides version control functionality in the context of collaborative systems without the need for a DMS. Accordingly, attribute information regarding attached files can include standard information such as the last save time and date of a file, the name of a file, the file type, etc.

Figure 2:
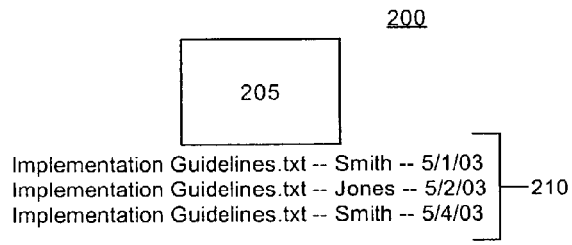
FIG. 2 is a schematic diagram illustrating an embodiment of a visual identifier for representing attached versions of a file in accordance with the inventive arrangements disclosed herein.

FIG. 2 is a schematic diagram illustrating one embodiment of a visual identifier 200 as was described with reference to FIG. 1. As shown, the visual identifier 200 can include an icon 205 and a text portion 210. The icon 205 can be any graphic symbol which, when displayed as part of an electronic document, indicates that more than one version of a file has been attached to the electronic document. The icon 205 further can specify the number of versions of a file that have been attached. For example, a numerical value can be included within the icon 205 specifying the number of versions attached to the electronic document. Notably, the icon 205 can be an activatable icon that can be selected and/or highlighted to access one or more other operations and/or graphical user interfaces.

The text portion 210 can specify any of a variety of attributes relating to the various versions of the file which have been attached to the electronic document. According to one embodiment of the present invention, the text portion 210 can include a listing having a reference to each version of the file that is attached to the electronic document. Thus, as shown, the text portion 210 specifies the name of each file version, which may or may not be the same, the person responsible for revisions to each version of the file, as well as the date the version was revised (the date that version was created).

It should be appreciated, however, that any of a variety of different file and/or version attributes can be included in the text portion 210. In particular, any attribute which is tracked by the collaborative system, or another system to which the collaborative system is communicatively linked, can be designated to appear within the text portion 210. Accordingly, the collaborative system can be configured to display those attributes which an organization finds most beneficial and informative regarding the different versions or revisions of a file.

Figure 3:
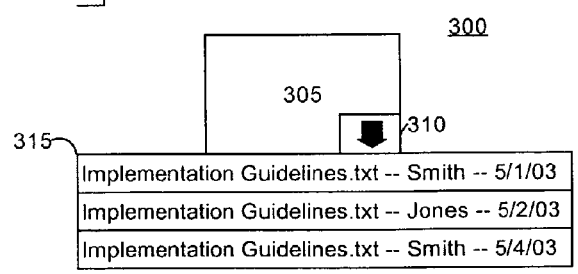
FIG. 3 is a schematic diagram illustrating another embodiment of a visual identifier in accordance with the inventive arrangements disclosed herein.

FIG. 3 is a schematic diagram illustrating another embodiment of a visual identifier 300 in accordance with the inventive arrangements disclosed herein. According to this embodiment, the listing of different versions of an attached file initially can be hidden from view. A selectable icon 310 can be included as part of the icon 305. Notably, the selectable icon 310 can be any of a variety of different graphical symbols, including but not limited to a numerical value specifying the number of versions attached. Selection of the icon 310 can cause a drop down menu 315 or listing of references to the different file versions to appear allowing a user to select a desired file version for further processing. It should be appreciated, however, that any of a variety of different selection mechanisms and presentation styles can be used for displaying selected attributes of the different file versions which have been attached to an electronic document. For example, according to one aspect of the present invention, the selectable icon 310 need not be included and a user need only select or highlight the icon 305 to view the menu 315.

Figure 4:
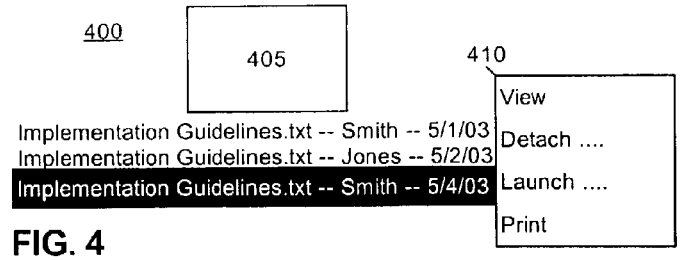
FIG. 4 is a schematic diagram illustrating yet another embodiment of a visual identifier in accordance with the inventive arrangements disclosed herein.

FIG. 4 is a schematic diagram illustrating another embodiment of a visual identifier 400 in accordance with the inventive arrangements disclosed herein. The visual identifier 400 illustrates an aspect of the present invention where one or more of the various references within the text portion of the of the visual identifier 400 can be selected. As shown, the most recent version of the attached file has been selected. Accordingly using one or more key commands and or pointer commands, a user can access the menu 410. For example, a user can right click on the desired file version thereby causing a pop-up style menu, such as menu 410 to appear. The user then can implement one or more operations upon the selected attached file version by selecting an option from the menu 410. More than one file version can be selected upon which functions such as printing, detaching and copying, or launching the selected file versions can be enacted.

Figure 5:
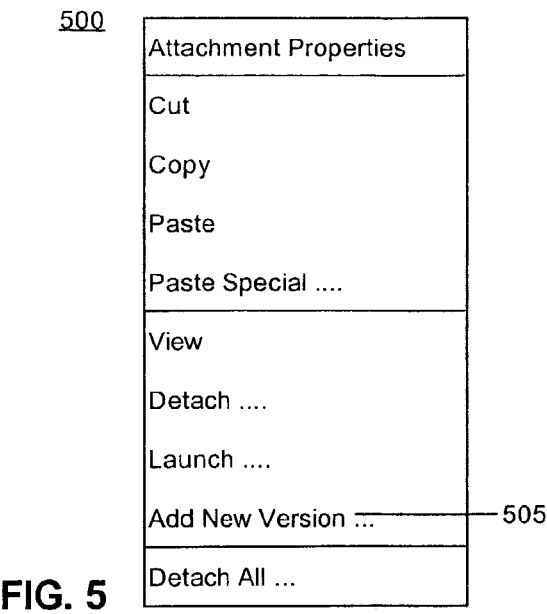
FIG. 5 is a schematic diagram illustrating an exemplary graphical user interface (GUI) for use with the inventive arrangements disclosed herein.

FIG. 5 is a schematic diagram illustrating an exemplary graphical user interface (GUI) 500 for use with the inventive arrangements disclosed herein. The GUI 500 can be presented responsive to a user request to attach one or more versions of a file to an electronic document. For example, after attaching a first version of a file to an electronic document, the GUI 500 can be presented responsive to a user selection of the representation of the file (or icon) within the electronic document. Thus, if option 505 is selected for adding new versions of a file to an electronic document, a navigational GUI can be presented through which a user can navigate to identify the version of the file to be attached to the electronic document. Accordingly, users can attach additional versions of a file to an electronic document as such versions become available or are generated.

Still, it should be appreciated that files need not be attached to an electronic document one at a time. Instead, for example, a user can initiate a request to attach multiple versions of a file to the electronic document either initially or after one or more versions previously have been attached to the electronic document. In that case, the user can select a plurality of file versions for attachment to the electronic document.

Figure 6:
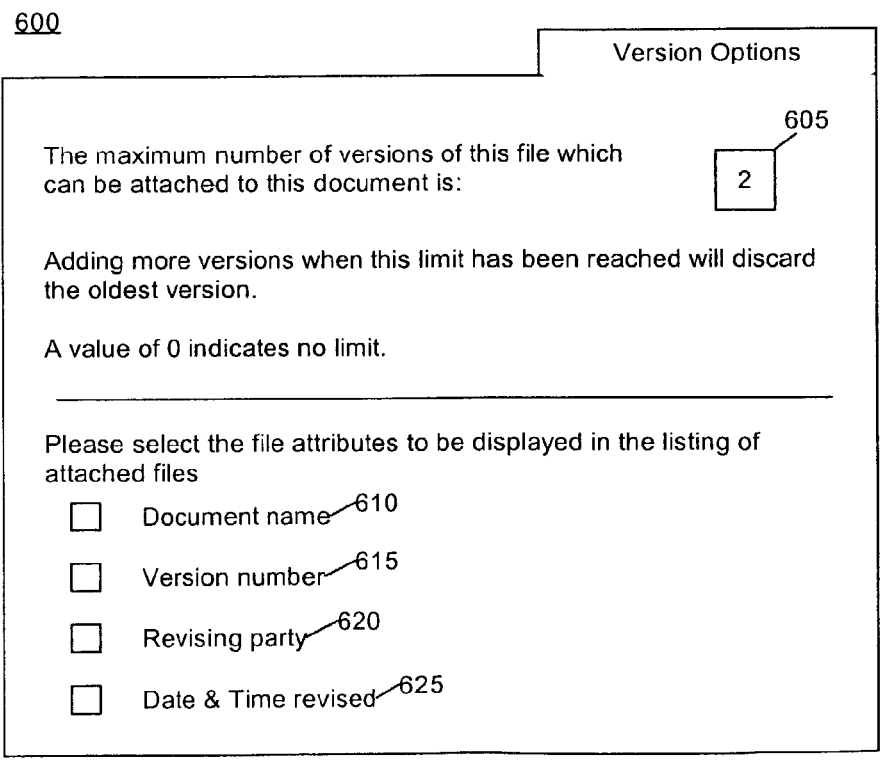
FIG. 6 is a schematic diagram illustrating another exemplary GUI that can be used to configure particular aspects of the present invention.

FIG. 6 is another exemplary GUI 600 which can be used to configure particular aspects of the present invention. The GUI 600 can include a control or text box 605 for specifying the number of versions of a file that can be attached to an electronic document. The GUI 600, for example, can be made accessible only to authorized personnel tasked with maintaining the collaborative system or application. Notably, the present invention can be configured such that if the number of versions to be attached to a particular electronic document exceeds the maximum threshold, the newly attached file version can be attached and another file version, for example the oldest file version, can be discarded. File versions can be discarded by overwriting the file versions, or removing and/or detaching the file versions from the electronic document. Thus, only the specified maximum number of file versions are attached and maintained as part of the electronic document.

Although not shown, an additional section can be included in GUI 600 which allows an authorized user to determine whether the collaborative system will prompt the user prior to discarding a version of an attached file when attaching a new or additional version of the file. If the user wishes to be prompted, the collaborative system can prompt the user in those cases where the number of files to be attached to an electronic document will exceed the threshold. If the user replies by instructing the collaborative application not to discard an attached version of the file, the additional or new file version will not be attached.

It should be appreciated that the attributes used to determine which version or versions of a file are to be discarded from the electronic document can vary. For example, through preferences, the collaborative application can discard the oldest version, the newest version, a version from a particular author or owner, or allow a user to select which file version is to be discarded. As noted, any attribute which is tracked or used by the collaborative system can be used to determine which version or versions are to be discarded.

The GUI 600 further can be used to allow authorized users to select one or more attributes to be included or specified within the listing of references associated with the visual identifier. For example, check boxes, radio buttons, or other controls can be included for the selection of attributes such as the document name 610, the file version number 615, the identity or username of the revising party or entity 620, and/or the date and time of revision 625 can be selected. If selected, the attributes can be included in the text portion of the visual representation. As noted, any attributes which can be tracked by the collaborative system or accessed by the collaborative system can be provided as selectable options for inclusion as part of the listing of references.

Figure 7:
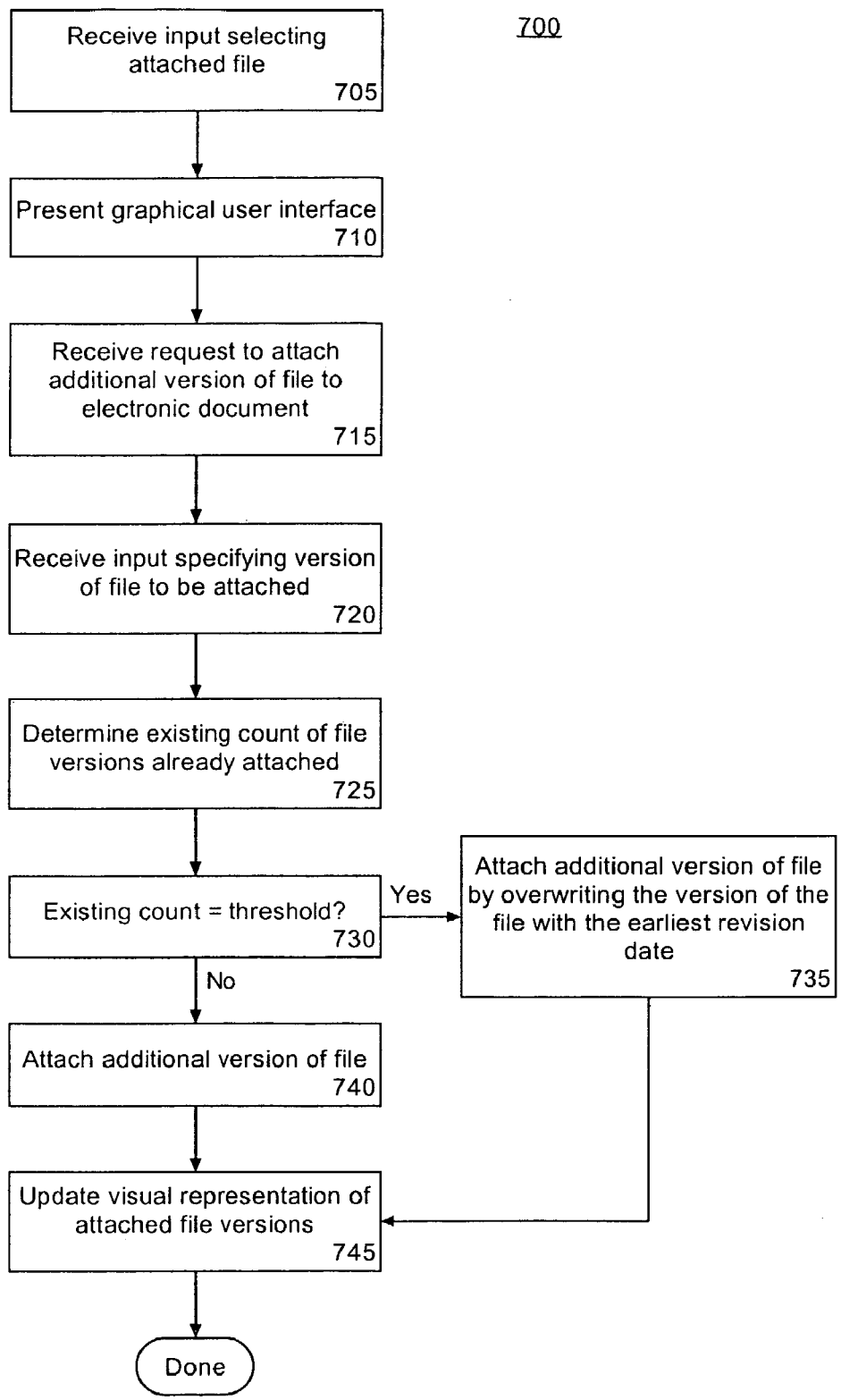
FIG. 7 is a flow chart illustrating a method of attaching one or more versions of a file to an electronic document in accordance with the inventive arrangements disclosed herein.

FIG. 7 is a flow chart illustrating a method 700 of attaching multiple versions of a file to an electronic document in accordance with one aspect of the present invention. The method 700 can be performed by a collaborative system or application as described herein with reference to FIG. 1. The method 700 can begin in a state where a first file has been attached to the electronic document. Accordingly, the method can begin in step 705 where an input selecting an attached file within the electronic document can be received. For example, a selection of an icon or other visual representation of the attached file can be selected with a pointer or other means. Once selected, in step 710, a GUI can be displayed. The GUI can include one or more options such as "detach file", "print file", "open" or "launch" file", and "attach additional version of file".

In step 715, a request to attach an additional version of the already attached file can be received. For instance, a pointer selection of the "attach additional version of file" option can be received. In step 720, input specifying the particular version of the file to be attached to the electronic document can be received. For example, a further GUI, such as a navigational GUI, can be displayed through which a user can navigate various directories of a data store to specify the version of the file to be attached to the electronic document.

In step 725, the collaborative application can determine the number of versions of the file which have already or previously been attached to the electronic document. In step 730, the number of existing versions of the attached file can be compared with a threshold value which can be set within the system. If the existing number of versions exceeds the threshold value, the method can proceed to step 735. If not, the method can continue to step 740.

In step 735, the earliest version of the attached file can be identified. This version, for example the version having the oldest revision date or one or more other versions having attributes which correspond to predetermined criteria, can be overwritten with the additional version of the file being attached. According to another aspect of the present invention, a version of the file can be detached or removed, and the additional version can be attached in place of the removed file version. Still, any of a variety of different mechanisms can be used such that the number of versions which are attached to the electronic document does not exceed a predetermined threshold. For example, if files are attached to the electronic document by including a reference to the file, the reference can be removed from the electronic document.

As noted, the method can include an optional step (not shown) where the user is first prompted before an attached file is discarded. If the user indicates that an attached file version can be discarded in order to attach a new or additional file version, then such action can be taken. If the user indicates that no attached file should be discarded in favor of a new or additional file version, the method can end. In that case, no additional file versions will be attached to the electronic document.

Continuing with step 740, in the case where the number of existing attached file versions does not exceed the threshold value, the additional version of the file can be attached to the electronic document. In step 745, the visual representation can be updated accordingly. For example, the visual identifier can be changed as indicated herein to provide an indication that more than one version of the file is attached to the electronic document. The visual identifier also can be altered to indicate the number of versions of the file which have been attached to the electronic document. Further, any attribute information regarding the versions of the file which have been attached can be included or updated within the visual identifier. Thus, the visual identifier, in addition to indicating that multiple versions of the file are attached to the electronic document, can specify attributes and/or a listing of those versions. After step 745, the method can end.

It should be appreciated that while method 700 illustrates one embodiment of the present invention, other embodiments also are contemplated. For example, one or more versions of a file can be added at substantially the same time rather than in serial fashion. In that case, the user can select multiple file versions rather than just one using a suitable GUI. Additionally, the various functions described herein which are provided by the collaborative system or software need not be accessed by selecting an attached file. Rather, additional drop down menus and/or activatable icons can be provided through which the user can gain access to the various features and functions described herein. For example, the visual identifier, rather than being displayed within a designated location of the electronic document for attachments, can be displayed within a toolbar, as part of a menu, or the like.

While the present invention has been described with reference to different file versions, it should be appreciated that one or more unrelated files, in terms of being versions of one another, can be attached to an electronic document and represented using an icon as described herein. In that case, the only association of the files can be a logical association wherein the files are listed beneath the same icon in the electronic document. For example, according to one embodiment of the present invention, multiple files of different types such as graphic files and word processing files can be listed or referenced beneath a single icon.

According to another embodiment of the present invention, multiple files of the same type can be represented by a single icon. For example, a single icon relating to an application can be displayed with a listing of all attached files to be opened or accessed with that application can be listed beneath the icon. If additional files which are associated with a second and different application have been attached to the electronic document, those files can be listed beneath a second icon pertaining to the second and different application. Thus, word processing file attachments can be listed beneath an icon relating to the associated word processor application, while graphics files can be listed beneath a second icon relating to the application to be used in opening or processing the graphics files.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of associating multiple files with an electronic document comprising:
   setting a threshold for a maximum number of files which can be attached to the electronic document;
   receiving a request to attach at least two files to The electronic document;
   attaching the at least two files to the electronic document;
   if the number of files attached to the electronic document exceeds the threshold, discarding one of the previously attached files and including the file that was attached last; and
   including within the electronic document a visual identifier indicating that more than one file is attached to the electronic document.

2. The method of claim 1, wherein the visual identifier includes a list having a reference to each file which has been attached to the electronic document.

3. The method of claim 2, wherein each reference of the list is selectable.

4. The method of claim 2, wherein the visual identifier further specifies attribute information for each file attached to the electronic document.

5. The method of claim 1, further comprising:
   updating a list of files when files are attached to or removed from the electronic document.

6. The method of claim 1, wherein said step discarding one or more files which already have been attached is selected from the group consisting of overwriting one or more of the files which already have been attached, removing at least one of the files which already has been attached, and removing a reference to at least one of the files which already has been attached.

7. The method of claim 1, further comprising:
   discarding at least one of the attached files from the electronic document; and
   updating the visual identifier according to said discarding step.

8. The method of claim 1, wherein the at least two files are versions of one another.

9. A method of associating multiple files with an electronic document comprising:
   setting a threshold for a maximum number of files which can be attached to the electronic document;
   attaching a file to the electronic document;
   including within the electronic document a graphic representation of the file;
   attaching at least a second file to the electronic document;
   if the number of files attached to the electronic document exceeds the threshold, discarding one of the previously attached files and including the file that was attached last; and
   modifying the graphical representation of the file to specify that more than one file is included in the electronic document.

10. The method of claim 9, wherein the graphical representation includes a list having a reference to each file which has been attached to the electronic document.

11. The method of claim 10, wherein each reference of the list is selectable.

12. The method of claim 9, further comprising:
    attaching additional files to the electronic document; and
    for each additional file attached, including a reference to the additional file in the list of files that are attached to the electronic document.

13. The method of claim 9, said graphic representation further specifying attribute information for each file attached to the electronic document.

14. The method of claim 9, further comprising:
    updating a list of files when files are attached to or removed from the electronic document.

15. The method of claim 9, wherein said step of discarding one or more files which already have been attached is selected from the group consisting of overwriting one or more of the files which already have been attached, removing at least one of the files which already has been attached, and removing a reference to at least one of the files which already has been attached.

16. The method of claim 9, further comprising:
    discarding at least one attached file from the electronic document; and
    updating the graphic representation according to said discarding step.

17. The method of claim 9, wherein the attached files are versions of one another.

18. A system of computer hardware and software for associating multiple files with an electronic document comprising:
    means for setting a threshold for a maximum number of files which can be attached to the electronic document;

means for receiving a request to attach at least two files to the electronic document;

means for attaching the at least two files to the electronic document;

means for discarding one of the previously attached files and including the file that was attached last when the number of files attached to the electronic document exceeds the threshold; and means for including within the electronic document a visual identifier indicating that more than one file is attached to the electronic document.

19. The system of claim 18, wherein the at least two files are versions of one another.

20. A system of computer hardware and software for associating multiple files with an electronic document comprising:

means for setting a threshold for a maximum number of files which can be attached to the electronic document;

means for attaching a file to the electronic document;

means for including within the electronic document a graphic representation of the file;

means for attaching at least a second version of the file to the electronic document;

means for discarding one of the previously attached files and including the file that was attached last when the number of files attached to the electronic document exceeds the threshold; and means for modifying the graphic representation of the file to specify that more than one version of the file is attached to the electronic document.

21. The system of claim 20, wherein the attached files are versions of one another.

22. A machine readable storage, having stored thereon a computer program having a plurality of code sections executable by a machine for causing the machine to perform the steps of:

setting a threshold for a maximum number of files which can be attached to the electronic document;

receiving a request to attach at least two files to the electronic document;

adding the at least two files to the electronic document;

if the number of files attached to the electronic document exceeds the threshold, discarding one of the previously attached files and including the file that was attached last; and including within the electronic document a visual identifier indicating that more than one file is attached to the electronic document.

23. The machine readable storage of claim 22, wherein the visual identifier includes a list having a reference to each file which has been attached to the electronic document.

24. The machine readable storage of claim 23, wherein each reference of the list is selectable.

25. The machine readable storage of claim 23, wherein the visual identifier further specifies attribute information for each of the files attached to the electronic document.

26. The machine readable storage of claim 22, further comprising:

updating a list of files when files are attached to or removed from the electronic document.

27. The machine readable storage of claim 22, wherein said step of discarding one or more files which already have been attached is selected from the group consisting of overwriting one or more of the files which already have been attached, removing at least one of the files which already has been attached, and removing a reference to at least one of the files which already has been attached.

28. The machine readable storage of claim 22, further comprising:

discarding at least one of the attached files from the electronic document; and updating the visual identifier according to said discarding step.

29. The machine readable storage of claim 22, wherein the at least two files are versions of one another.

30. A machine readable storage, having stored thereon a computer program having a plurality of code sections executable by a machine for causing the machine to perform the steps of:

setting a threshold for a maximum number of files which can be attached to the electronic document;

attaching a file to the electronic document;

including within the electronic document a graphic representation of the file;

attaching at least a second file to the electronic document;

if the number of files attached to the electronic document exceeds the threshold, discarding one of the previously attached files and including the file that was attached last; and modifying the graphic representation of the file to specify that more than one version of the file is attached to the electronic document.

31. The machine readable storage of claim 30, wherein the graphic representation includes a list having a reference to each file which has been attached to the electronic document.

32. The machine readable storage of claim 31, wherein each reference of the list is selectable.

33. The machine readable storage of claim 30, further comprising:

attaching additional files to the electronic document; and for each additional file attached, including a reference to the additional file in the list of files that are attached to the electronic document.

34. The machine readable storage of claim 30, said graphic representation further specifying attribute information for each file attached to the electronic document.

35. The machine readable storage of claim 30, further comprising:

updating a list of versions of the file when versions are attached to or removed from the electronic document.

36. The machine readable storage of claim 30, wherein said step of discarding one or more files which already have been attached is selected from the group consisting of overwriting one or more of the files which already have been attached, removing at least one of the files which already has been attached, and removing a reference to at least one of the files which already has been attached.

37. The machine readable storage of claim 30, further comprising:

discarding at least one of the attached files from the electronic document; and updating the graphic representation according to said discarding step.

38. The machine readable storage of claim 30, wherein the attached files are versions of one another.

* * * * *